United States Patent
Alpert et al.

(10) Patent No.: US 6,259,775 B1
(45) Date of Patent: *Jul. 10, 2001

(54) MULTI-LINE MODEM INTERFACE

(76) Inventors: Martin A. Alpert, 180 Basswood La., Moreland Hills, OH (US) 44022; Laszlo Istvan Morocz, 1074 SR 534 NW., Newton Falls, OH (US) 44444; Mark D. Niemiec, 2260 Par La. PH7, Willoughby Hills, OH (US) 44094

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,289

(22) Filed: Sep. 5, 1997

(51) Int. Cl.[7] ................................... H04M 11/00
(52) U.S. Cl. .................... 379/93.05; 379/93.07; 379/100.12
(58) Field of Search ............... 379/93.05, 93.07, 379/93.09, 93.11, 93.28, 92.01, 100.05, 100.12

(56) References Cited

U.S. PATENT DOCUMENTS

| | | | |
|---|---|---|---|
| 5,127,041 | * | 6/1992 | O'Sullivan .................. 455/557 |
| 5,511,115 | * | 4/1996 | Bayerl et al. ................ 379/142 |
| 5,530,951 | * | 6/1996 | Argintar .................. 379/93.07 |
| 5,636,034 | * | 6/1997 | Ishikawa .................. 358/434 |

* cited by examiner

Primary Examiner—Curtis Kuntz
Assistant Examiner—Melur Ramakrishnaiah
(74) Attorney, Agent, or Firm—Renner, Otto, Boisselle & Sklar, LLP

(57) ABSTRACT

A multi-line modem interface circuit includes a processor and a sensing circuit coupled to the processor. The sensing circuit is operable to identify a status of one or more external lines and communicate the status to the processor. A control circuit is coupled to the processor, and the processor is operable to automatically configure a line connection configuration for either incoming or outgoing voice or data communications in accordance with programmed, user-defined preferences associated with the processor. The interface circuit is operable to automatically monitor a line to determine if it's ringing, determine whether it's allowed and couple the line to the modem for potential answer. The interface circuit line monitoring is non-invasive and keeps the modem from interfering with calls in progress. A method of interfacing multiple external phone lines with one or more internal lines and a modem for incoming or outgoing voice or data transmissions includes the step of monitoring a modem to determine whether the modem is attempting to initiate a transmission via an external line. In addition, the method includes determining whether the external lines are available or allowed for the outgoing transmission and coupling an external line to the modem in response to the determination.

3 Claims, 3 Drawing Sheets

MULTI-LINE MODEM INTERFACE

FIELD OF THE INVENTION

The present invention relates to electrical circuits for modems and more particularly relates to a multi-line interface circuit and method for automatically and transparently interfacing a modem with multiple phone lines.

BACKGROUND OF THE INVENTION

It is common today for homes and/or businesses to have multiple phone lines to accommodate telephone communications, facsimile transmissions and/or computer modems. In prior art systems, each component (a telephone, facsimile machine or modem) would typically have its own dedicated telephone line so that when operating the phone line was in use and otherwise went unutilized. This required multiple telephone lines although the multiple lines were seldom needed at the same time. This resulted in an undesirably large number of telephone lines which resulted in incurring high costs.

One prior art solution to the above problem was to create a user-operated switching box that allowed multiple components to share a single telephone line. In such a system, a user could select which component would occupy (utilize) the telephone line and the switching box operated as a multiplexer to selectively couple the telephone, facsimile machine or modem to the telephone line to make an outgoing connection. This prior art solution, however, had limitations since, for outgoing calls, the manual switching of the various components to the desired telephone line was often inconvenient and took additional time. This made the solution undesirable. In addition, in multi-line applications, the switching box could not automatically switch the call to an available line if an incoming call was made to a line already in use.

Accordingly, there is a strong need in the art for a system that allows for an automatic, transparent interface between multiple telephone lines and a modem within a home or business.

SUMMARY OF THE INVENTION

The present invention includes a system and method for interfacing multiple telephone lines with a conventional modem, fax modem or voice modem. The modem may be a stand alone component or part of another component (e.g., facsimile machine) which typically includes a modem. The invention provides automatic, transparent interfacing with the multiple lines to allow access to multiple telephone lines without requiring a user to manually switch internal lines onto or off of a particular telephone line. The invention further provides user flexibility by allowing a user to dictate connection preferences if multiple available interfacing options exist. The present invention further allows some lines to preclude transmissions altogether.

According to one aspect of the present invention, an interface circuit couples multiple incoming telephone lines to a modem and internal telephone lines. When an incoming communication occurs, the interface circuit detects the incoming call, checks its user-defined preferences, checks for internal line availability and automatically couples the call to an internal line in response to its analysis. Likewise, when an outgoing transmission is conducted via a modem, the interface circuit detects the outgoing transmission, checks its user-defined preferences and external line availability and automatically couples the call to an external line. If multiple external lines are available, the interface automatically and transparently couples the modem to the preferred external line dictated by the user-defined preferences.

The present invention is applicable to standard modem circuitry and may even be utilized in conjunction with off-the-shelf modems. In addition, the interface circuit also employs variable sensitivity monitoring circuitry to sense the status of the external telephone lines.

The foregoing and other features of the invention are hereinafter fully described and particularly pointed out in the claims, the following description and the annexed drawings setting forth in detail one or more illustrative embodiments of the invention.

DETAILED DESCRIPTION OF THE INVENTION

Figure 1:
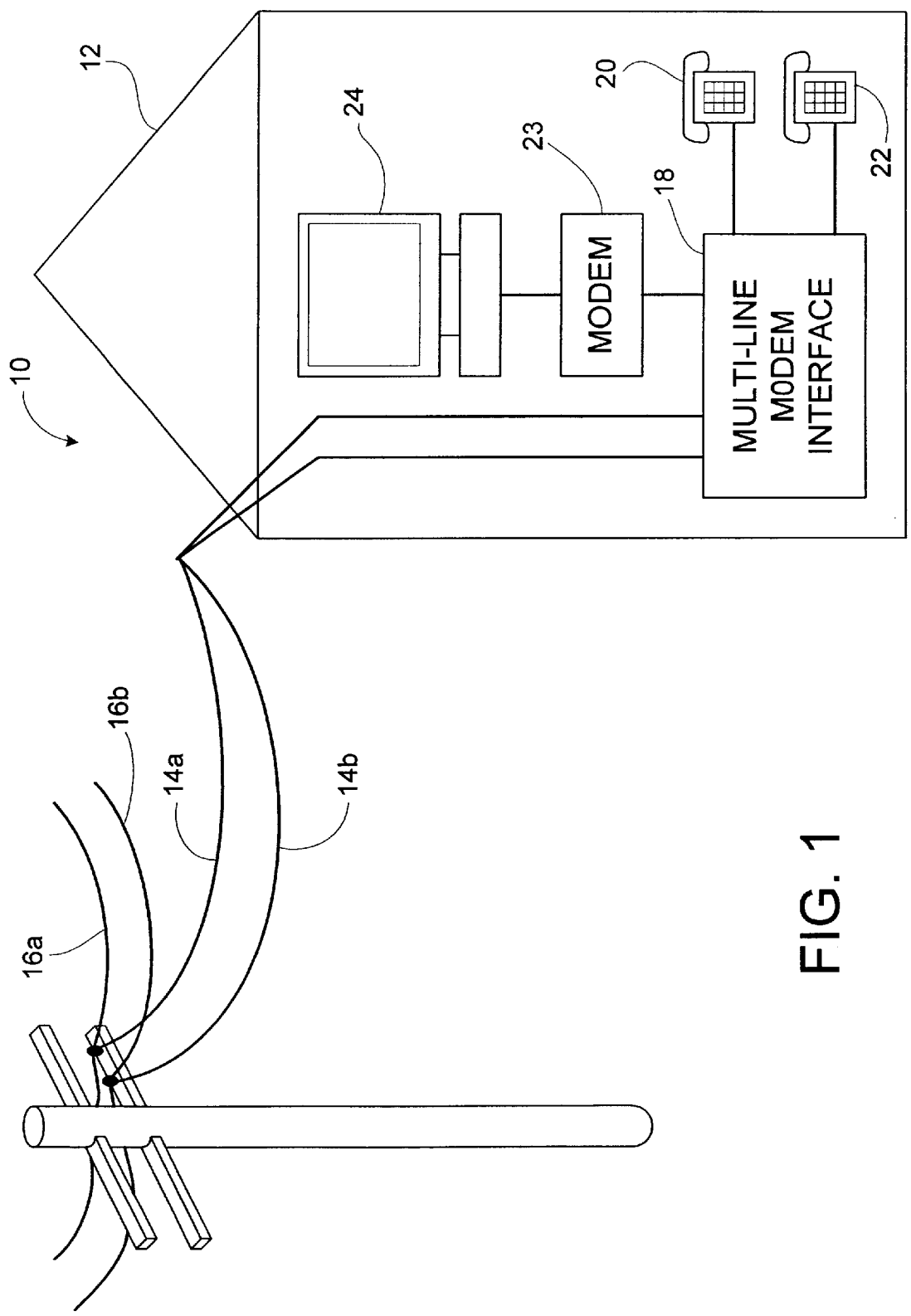
FIG. 1 is a system level diagram illustrating the present invention in an environmental context, according to one embodiment of the invention.

The present invention will now be described with reference to the drawings wherein like reference numerals are used to refer to like elements throughout. The present invention includes a system and method of interfacing multiple phone lines to a modem within one's home or business. The system is operable for incoming or outgoing transmissions, whether data or voice communications, and automatically couples a phone line to a modem based upon user selected preferences.

Turning now to the figures, FIG. 1 is an environmental view illustrating a system 10 incorporating the present invention. The system 10 includes, for example, a home 12 having multiple conventional phone lines 14a and 14b originating from lines 16a and 16b provided by the telephone company. The multiple phone lines 14a and 14b enter the home 12 and couple to a multi-line modem interface circuit 18. The multiline modem interface circuit 18 contains selected user preferences that direct the interface circuit 18 to select a particular line first, if available, or alternatively precludes certain telephone lines from being utilized altogether. The interface circuit 18 selectively couples the lines 14a and 14b to either, for example, telephones 20 and 22, or to a computer 24 via a modem 23. Such selective coupling occurs automatically for both incoming and outgoing voice and data transmissions as will be described more fully in conjunction with FIGS. 2 and 3. Although FIG. 1 illustrates two single-line phones connected to the interface circuit 18, the invention is also applicable to a single, dual-line telephone.

Figure 2:
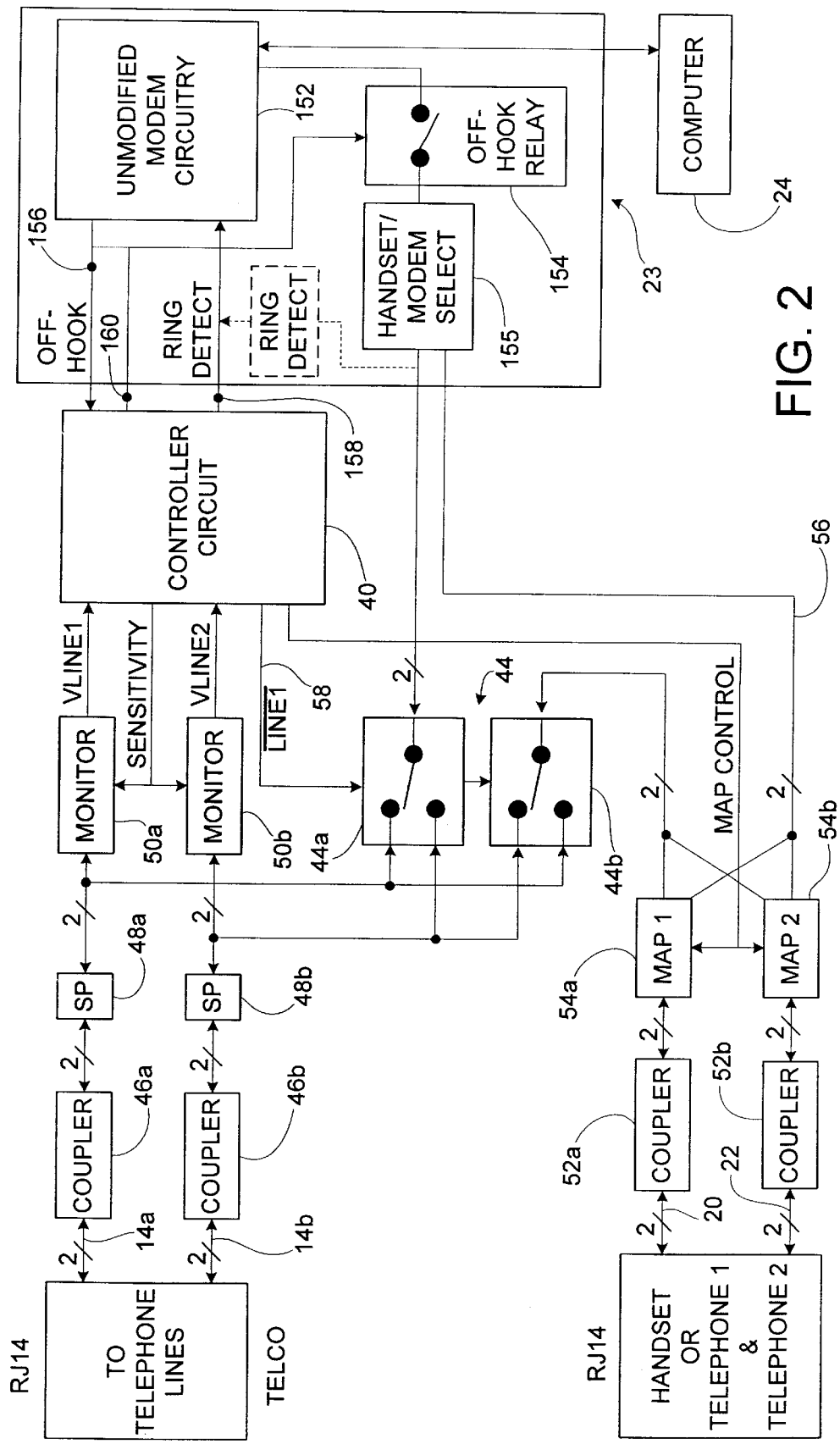
FIG. 2 is a schematic diagram illustrating an interface circuit according to one embodiment of the present invention.

FIG. 2 is a schematic diagram illustrating the multi-line modem interface circuit 18 coupled to a modem 23. In this particular embodiment, the interface circuit 18 is illustrated with two telephone lines 14a and 14b and two telephones 20 and 22. The present invention, however, is equally applicable to more than two phone lines and may even be used in conjunction with a single telephone line. The interface circuit 18 includes an interface controller 40 (preferably a programmable I/O controller). The interface controller 40 provides control signals to relays 44*a* and 44*b*. The interface controller 40 is coupled to the telephone lines 14*a* and 14*b* through a network of couplers 46*a* and 46*b*, surge protection circuits 48*a* and 48*b* and line monitoring circuits 50*a* and 50*b*. Two relays 44*a* and 44*b* also connect to the telephones 20 and 22 through a network of couplers 52*a* and 52*b* and switches 54*a* and 54*b* that map the external lines 14*a* and 14*b* to the internal lines that are coupled to the telephones 20 and 22.

The multi-line modem interface circuit 18 operates in the following manner. In describing the circuit's operation each component within the circuit 18 will first be briefly described so that the interaction between the various components can be better understood. The couplers, such as the couplers 46*a*, 46*b*, 52*a* and 52*b* include a network of coils and capacitors as is well known by those skilled in the art that buffer incoming and outgoing signals and perform electromagnetic interference (EMI) suppression. The surge protection circuits 48*a* and 48*b* prevent high voltage spikes (that often occur on the external phone lines 14*a* and 14*b*) from damaging the modem interface circuitry that operates at low voltages, for example, in the range of 0–120 volts. The line monitoring circuits 50*a* and 50*b* preferably consist of a resistor/opto-isolator network and monitor the voltage on the external lines 14*a* and 14*b* and provide control signals to the interface controller 40 in response to the voltage measured on the lines 14*a* and 14*b*. The line monitoring circuits 50*a* and 50*b* detect the line voltages in accordance with the published phone company voltage values to determine whether the lines are on-hook (hung up), off-hook (picked up/busy), on hold or ringing. Analog signals in the range of 0–5 volts are provided to the interface controller 40 by the line monitoring circuits 50*a* and 50*b* to thereby monitor the status of the external phone lines 14*a* and 14*b*. The line monitoring circuits 50*a* and 50*b* monitor the lines 14*a* and 14*b* without interfering with any calls.

The interface controller 40 is preferably an 8-bit microprocessor (but may in other embodiments utilize other control technologies) which controls the automatic switching functions via the relays 44*a* and 44*b* based on the control signals from the line monitoring circuits 50*a* and 50*b*, the programmed user preferences and the modem's activities which are communicated to the interface controller 40 from the modem 23. The switches 54*a* and 54*b* provide a mapping function to control which internal telephone 20 or 22 will share its line with the modem 23. In a preferred embodiment, this mapping is fixed. Alternatively, however, the mapping may be placed under user control to allow the user to customize his own mapping. For example, the switch 54*a* may be set to couple the telephone 20 to the relay 44*b* while the switch 54*b* couples the telephone 22 to the line 56 to share with the modem 23. Alternatively, the switches 54*a* and 54*b* may be altered to provide the opposite connections. In the following discussion of the circuit 18, the switches 54*a* and 54*b* are set so that the telephone 20 is coupled to the relay 44*b* and the telephone 22 is coupled to the relay 44*a* and therefore shares a line with the modem 23.

The modem 23 is illustrated in FIG. 2, wherein dotted lines indicate deleted connections from standard modems. The modem 23 also includes standard, unmodified modem circuitry 152 and an off-hook relay 154 coupled between the circuitry 152 and a handset/modem select interface 155 within the modem 23.

The modem 23 provides an off-hook line 156 which provides a signal to the interface controller 40 to indicate when the modem 23 wishes to make a call (initiate a transmission). The interface controller 40 provides a ring detect signal 158 to the modem 23, thereby allowing internal ring detect circuitry of standard modems to be eliminated. The interface controller 40 communicates to the modem 23 through the ring detect signal 158 that an incoming call is taking place. The interface controller 40 also provides a relay control signal 160 to activate and deactivate the relay 154 for transmission of audio signals to the modem 23 via the handset/modem select interface 155.

In the case where a transmission is desired via the modem 23 (such as, for example, accessing the Internet, sending a fax or playing a recorded message), the interface circuit 18 operates with the modem 23 in the following manner. The modem 23 indicates to the interface controller 40 via the off-hook signal 156 that a call wishes to be made by the modem 23 on an external line (the modem 23 does not care whether line 14*a* or 14*b* is to be used). The interface controller 40 checks the status of both lines 14*a* and 14*b* via the line monitoring circuits 50*a* and 50*b* and its internal, user selected preferences (preferably stored in DIP switches or alternatively in a memory, such as an EEPROM coupled to the interface controller 40) to see whether either of the lines 14*a* or 14*b* are available and allowed to be used. DIP switches are preferred because such a configuration allows a user to reprogram the preferences without the need for proprietary software. Consequently, the modem interface circuit 18 is 100% compatible with existing modem software packages. If both lines 14*a* and 14*b* are on-hook (hung up), then both are available. If the programmed, user selected preferences allow either available line (14*a* or 14*b*) to be used, then the interface controller 40 determines which line is preferred. This feature is advantageous since, if one line number is unlisted, incoming calls to that line are unlikely and it may therefore be desirable to select that line as the preferred line for outgoing calls. The interface controller 40 then outputs a control signal 58 to the relays 44*a* and 44*b* to couple the modem 23 and associated telephone to either line 14*a* or 14*b* as determined by the interface controller 40 for the data transmission to be initiated. The control signal 58 toggles the relays 44*a* and 44*b*; in one state the interface controller 40 couples the modem to the first line 14*a*. If, at that time, another outgoing call must be made, the telephone 20 is automatically coupled, via the relay 44*b*, to the other external line 14*b*.

In another state (again, based on the user selected preferences within the interface controller 40), the interface controller 40 couples the modem 23 to the second line 14*b* via the relay 44*a* and another call with the telephone 20 may take place on the first line 14*a* via the relay 44*b*. The interface controller 40, after properly configuring the connection via the relays 44*a* and 44*b*, activates the off-hook relay 154 via the relay control signal 160, thereby closing the relay 154 and allowing the audio signal to be transferred to the appropriate line (14*a* or 14*b*) through the relay 44*a*. After transmission is complete, the modem 23 changes the state of the off-hook signal 156 and the interface controller 40, in return, deactivates the relay 154 via the relay control signal 160.

In the current implementation, the telephone 20 (telephone 1) is always mapped to the same line used by the modem 23. The other telephone 22 (telephone 2) is always mapped to the line not used by the modem 23. This allows the telephone 20 to be used as an external handset for the modem 23 and the telephone 22 to be a normal extension phone on the line not used by the modem 23. If the telephones 20 and 22 are combined into a single, dual-line phone, then line 1 (20) will always be the modem handset while line 2 (22) will be the extension. The coupling interface function is performed by the existing handset/modem select interface circuitry 155 in the modem 23.

With incoming calls the interface circuit 18 operates like standard, dual telephone lines, wherein the connections are dictated by default settings (dictated by the user selected preferences) of the interface controller 40. If an incoming call arrives on one of the lines 14a or 14b that couples to the modem 23 and telephone 22 through the relay 44a, the interface controller 40 detects the incoming call and checks its internal preferences to see whether a transmission is allowed on that line. If no such transmission is allowed on that line, the interface controller 40 maintains the relay control signal 160 in its present state, thereby maintaining the relay 154 unenergized. If, however, the user preferences within the interface controller 40 permit the call, the interface controller 40 activates the ring detect signal 158. Since the relays 44a and 44b are already set, the telephone 22 associated with the modem 23 (in this particular embodiment) via the internal line 56 will ring.

The monitors 50a and 50b have a low sensitivity mode when the lines are on-hook (busy) and a normal sensitivity mode otherwise. The interface controller 40 controls when the monitors 50a and 50b utilize low sensitivity mode and high sensitivity mode, respectively. The interface controller 40 selects low sensitivity mode when the modem is on-hook since a modem will respond only to AC voltages greater than 60 volts, consequently normal sensitivity is not required. This low sensitivity mode allows the present invention to continuously monitor lines for incoming ring signals while meeting FCC current draw specifications. In a low sensitivity mode, a DC blocking capacitor prevents the monitors 50a and 50b from drawing any DC current. They can, however, draw the AC current that occurs during a ring signal. This AC current has a voltage on the order of about 90 volts. The fact that this much AC voltage is required for the monitors 50a and 50b to report a ring is the reason for calling this mode low sensitivity. In the high sensitivity mode, the DC blocking capacitor is bypassed by a relay (controlled by the interface controller 40), thereby allowing the monitors 50a and 50b to draw current when the voltages are a fraction of a volt DC.

If the line happens to be busy (with voice communications), the monitor is set back to low sensitivity and the modem leaves the line alone. The test process is inaudible and non-invasive and therefore does not interfere with any calls in progress on a busy line. Furthermore, the test is virtually undetectable since it causes only a small change in the current draw of an off-hook phone for only a small fraction of a second.

As can be seen by the above discussion, the multi-line modem interface circuit 18 provides an automatic, transparent interface for multiple telephone lines, thereby allowing for incoming and outgoing voice or data transmissions without any manual switching or line selections taking place.

Figure 3:
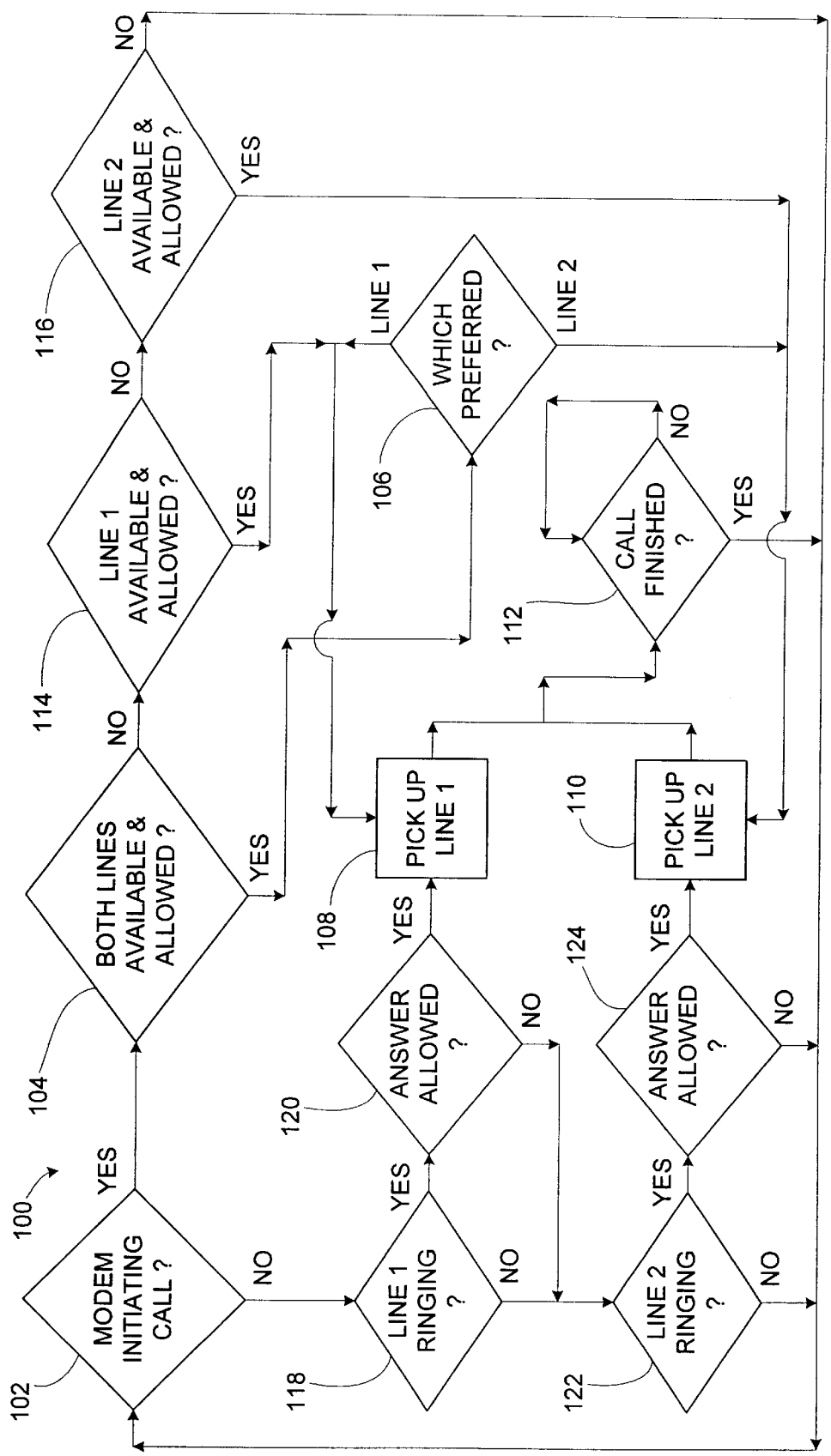
FIG. 3 is a flow chart illustrating a method of interfacing multiple telephone lines to various components within one embodiment of the present invention.

FIG. 2 is one interface circuit 18 that may carry out the present invention. The present invention, however, may be more broadly characterized as a method of interfacing multiple phone lines for voice and/or data communications. FIG. 3 is a flow chart diagram illustrating a method 100 of the present invention for interfacing multiple phone lines to communication components such as telephones or modems within a home or business. FIG. 3 illustrates the method steps that may be taken for an outgoing transmission or an incoming communication.

At step 102 the interface circuit 18 queries whether the modem 23 is initiating a call. As is well known by those skilled in the art, when the modem 23 initiates a call, a data transmission signal (such as the off-hook signal 156 of FIG. 2) within the modem 23 changes state to provide an indication that such data transmission will proceed. The interface circuit 18 therefore monitors the off-hook signal at step 102 to make such a determination. If the signal at step 102 indicates that the modem 23 is initiating a call (YES) the interface circuit 18 evaluates user selected preferences within the circuit. Preferably, the preferences are dictated by DIP switches. Alternatively, however the preferences may be software driven preferences that may be subsequently modified by the user if desired. Alternatively, however, the preferences may be provided to the interface circuit manufacturer who then hard-wires the preferences into the configuration of the interface circuit 18.

Based upon the selected user preferences, the interface circuit 18 provides various functions. For example, the circuit 18 will check whether both lines are available (meaning that at that moment no one is using either line 14a or 14b and the user permits modem transmission to occur on either line) at step 104. If either line (14a and 14b) is available and allowed to be used (YES) the interface circuit 18 checks to see which of the available lines is preferred at step 106 (either line 1 (14a) or line 2 (14b)). If line 1 (14a) is preferred, the interface circuit 18 couples the modem 23 to line 14a at step 108 (the Pick Up Line 1 box). Alternatively, if line 2 (14b) is preferred, the interface circuit 18 couples the modem to line 14b at step 110 (the Pick Up Line 2 box). In any event, the interface circuit 18 monitors the data transmission on either line at step 112 and upon its completion returns to step 102. Note that in the above method, the transmission along either line occurs automatically. A user does not need to manually switch the modem 23 onto a line. Instead, the interface circuit 18, due to its programmed, user-selected preferences, checks to see if the lines are available and, if so, selects the preferred line.

A user can select preferred lines for voice or data transmission for a variety of reasons. In one scenario, a user may select transmission to occur on line 2 (14b) if line 1 (14a) is the only line with a listed phone number. In this case, one expects that incoming calls will generally be on line 1 (14a) and therefore line 2 (14b) is preferred for outgoing transmission so that the other phone line is preferably left open for incoming calls.

If at step 104, the interface circuit 18 determines that either both lines are not available or not allowed (NO) (via the user selected preferences or the present phone line status (a line is being used)) the interface circuit 18 further queries at step 114 whether line 1 (14a) is available and allowed. If so (YES), the method proceeds to step 108 where the transmission on line 1 (14a) is effectuated. If, however, at step 114, the interface circuit 18 determines that line 1 (14a) is either not available or not allowed (NO), the interface circuit 18 then checks whether line 2 is available and allowed at step 116. If line 2 (14b) is available and allowed (YES), the interface circuit 18 initiates the data transmission on line 2 (14b) at step 110. Otherwise, if line 2 (14b) is not available and allowed (NO), then neither of the lines (14a and 14b) are available or allowed. At this point, the method 100 preferably abandons the attempt and no dialtone is reported by the modem 23 to controlling computer software which may then report an error. Alternatively, however, the method may retry by returning to step 102 and attempt to establish a connection. Alternatively, the interface circuit 18 may wait a pre-determined period of time (for example, 1 second or more) and then retry at step 102. In yet another alternative embodiment, the interface circuit 18 may provide a visual and/or audible indication that data transmission can not proceed and ask the user whether user-selected preferences wish to be changed or if a retry should be conducted within a selected period of time.

The interface circuit 18 also works to automatically couple incoming communications from either line 14a or 14b to the appropriate telephone 20 or 22 or alternatively couple incoming transmissions to the modem 23. In the case of an incoming transmission, the method utilizing the interface circuit 18 works to automatically couple the data to the modem 23 in the following manner. If the interface circuit 18 determines that line 1 (14a) is ringing at step 118 (YES) (an incoming call) it checks the user selected preferences at step 120 to determine whether an incoming communication on line 1 (14a) is permitted. If an answer is permitted at step 120 (YES) the interface circuit 18 couples the line 14a to the modem 23. The interface circuit 18 also monitors the second line 14b to see whether the line is ringing at step 122. If the interface circuit 18 determines that line 2 (14b) is ringing at step 122 (YES) (an incoming call) it checks the user selected preferences at step 124 to determine whether an answer on line 2 (14b) is permitted. If an answer is permitted at step 124 (YES) the interface circuit 18 couples the line 14b to the modem 23.

When an incoming call is on a line that permits a communication (a YES answer at steps 120 or 124), the method indicates to the modem 23 an incoming call via a ring detect signal (such as, for example, the signal 158 of FIG. 2). Once finished, at step 112, the modem 23 indicates completion through an off-hook signal to the interface circuit.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, compositions, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments, as may be desired and advantageous for any given or particular application.

What is claimed is:

1. A multi-line modem interface circuit for selectively providing access to any of a plurality of telephone lines, the interface circuit comprising:

a plurality of first inputs each for connecting the interface circuit to a corresponding one of the plurality of telephone lines;

a second input for connecting the interface circuit to a telephone line connection of a telecommunications device, wherein the number of telephone lines is greater than or equal to the number of telecommunication devices;

a processor for receiving a request for telephone line access from the telecommunications device;

a sensing circuit including line status monitors, operatively coupled to the processor, for monitoring a status of the plurality of telephone lines; and a control circuit, operatively coupled to the processor, for selectively coupling the telephone line connection of the telecommunications device to a selected one of the plurality of telephone lines in response to an output signal from the processor, wherein the processor receives the request for telephone line access from the telecommunications device and generates an output signal to the control circuit to couple the telecommunications device to the selected telephone line in response to the request and the status of the plurality of telephone lines, wherein the sensing circuit has a variable sensitivity, and wherein when the modem is off-hook the sensing circuit has a low sensitivity and otherwise has a normal sensitivity.

2. A method of interfacing multiple external phone lines with one or more internal lines and a modem for incoming or outgoing voice or data transmissions, comprising the steps of:

transmitting a phone line access request to a processor when the modem is attempting to initiate a transmission via an external line;

determining based on one or more preferences whether the external lines are available or allowed for the outgoing transmission in response to the access request; and coupling an external line to the modem in response to the determination, wherein the step of determining based on preferences whether the external lines are allowed comprises consulting user-defined preferences, wherein the preferences indicate whether an available external line is an unlisted number.

3. A multi-line modem interface circuit for selectively providing access to any of a plurality of telephone lines, the interface circuit comprising:

a plurality of first inputs each for connecting the interface circuit to a corresponding one of the plurality of telephone lines;

a second input for connecting the interface circuit to a telephone line connection of a telecommunications device, wherein the number of telephone lines is greater than or equal to the number of telecommunication devices;

a processor for receiving a request for telephone line access from the telecommunications device;

a sensing circuit including line status monitors, operatively coupled to the processor, for monitoring a status of the plurality of telephone lines; and a control circuit, operatively coupled to the processor, for selectively coupling the telephone line connection of the telecommunications device to a selected one of the plurality of telephone lines in response to an output signal from the processor, wherein the processor receives the request for telephone line access from the telecommunications device and generates an output signal to the control circuit to couple the telecommunications device to the selected telephone line in response to the request and the status of the plurality of telephone lines, wherein the processor is programmable to determine based on preferences whether an available external line is an unlisted number.

* * * * *